No. 881,026. PATENTED MAR. 3, 1908.
J. P. PARSONS & W. FLEMING.
SPRING CUSHION FOR AUTOMOBILE TIRES.
APPLICATION FILED JULY 6, 1907.

3 SHEETS—SHEET 1.

INVENTORS

No. 881,026.
PATENTED MAR. 3, 1908.
J. P. PARSONS & W. FLEMING.
SPRING CUSHION FOR AUTOMOBILE TIRES.
APPLICATION FILED JULY 6, 1907.
3 SHEETS—SHEET 3.
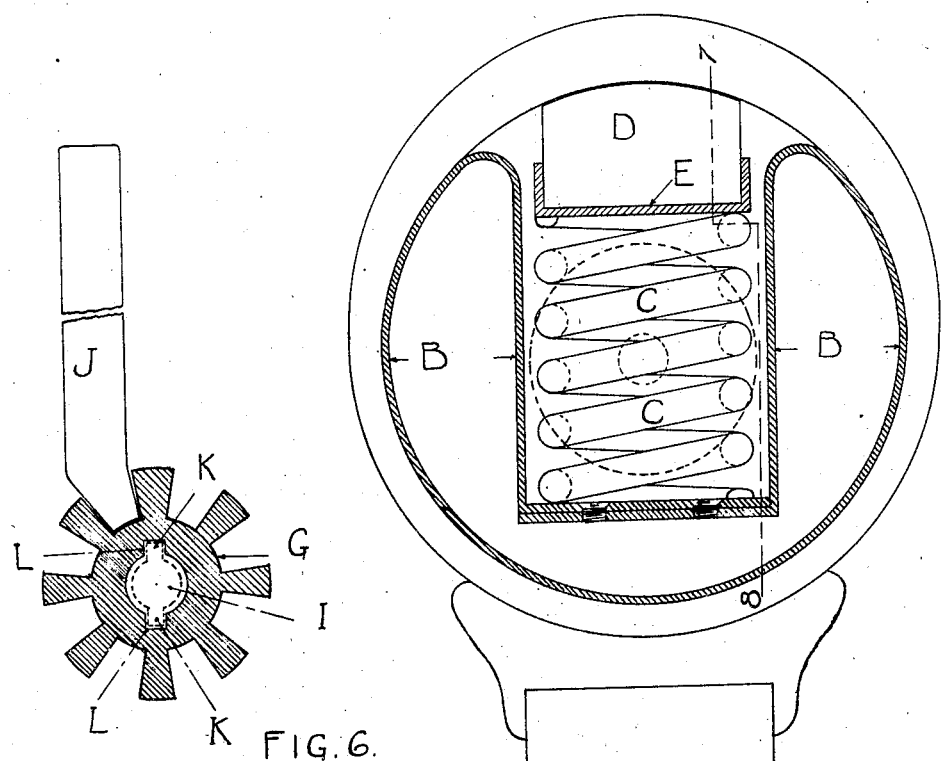
FIG. 2.
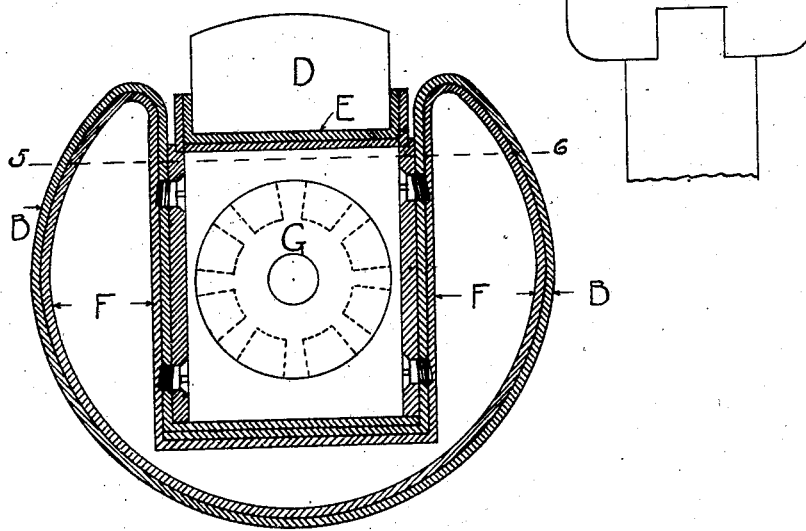
FIG. 6.
FIG. 3.
INVENTORS

UNITED STATES PATENT OFFICE.

JOHN PORTER PARSONS AND WILLIAM FLEMING, OF PITTSBURG, PENNSYLVANIA.

SPRING-CUSHION FOR AUTOMOBILE-TIRES.

No. 881,026.

Specification of Letters Patent.

Patented March 3, 1908.

Application filed July 6, 1907. Serial No. 382,518.

*To all whom it may concern:*

Be it known that we, JOHN PORTER PARSONS and WILLIAM FLEMING, citizens of the United States, residing at Pittsburg, in the county of Allegheny and State of Pennsylvania, have invented a new and useful Spring-Cushion for an Automobile-Tire, of which the following is a specification.

Our invention relates to improvements in resilient tires, and it consists in the constructions, combinations and arrangements herein described and claimed.

An object of our invention is to provide an improved cushion tire adapted for advantageous use on automobiles and other vehicles, and which eliminates the practical defects inherent to penumatic tires.

A further object of our invention is to provide a spring cushion tire which can be readily expanded or contracted in position to meet all conditions or use.

In the accompanying drawings, forming a part of this application and in which similar reference symbols indicate corresponding parts in the several views—

Figure 1:
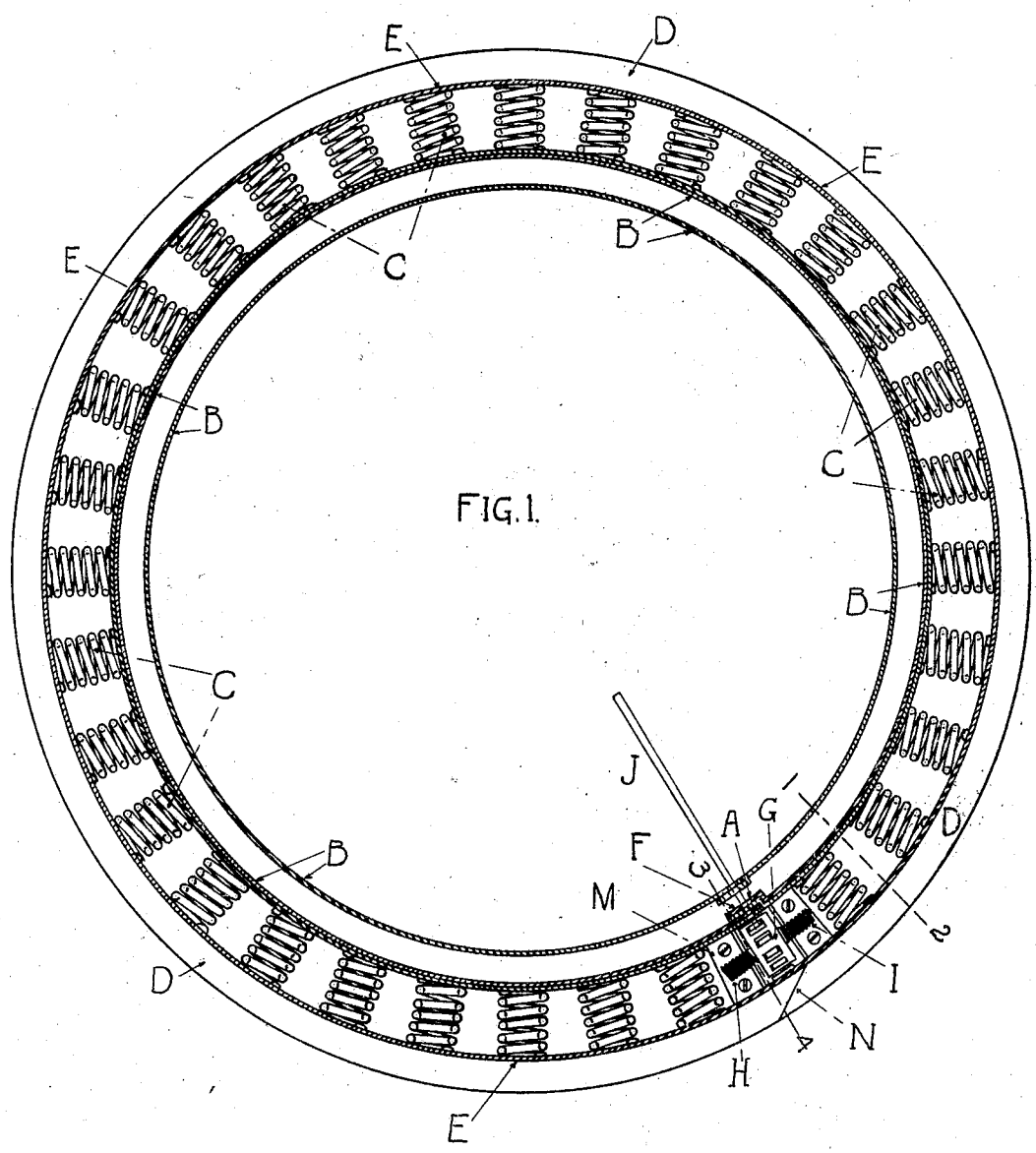
Figure 4:
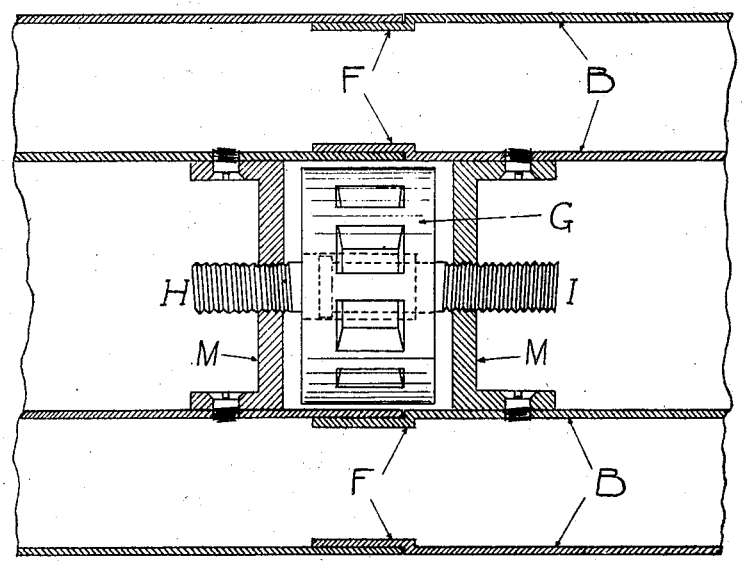
Figure 5:
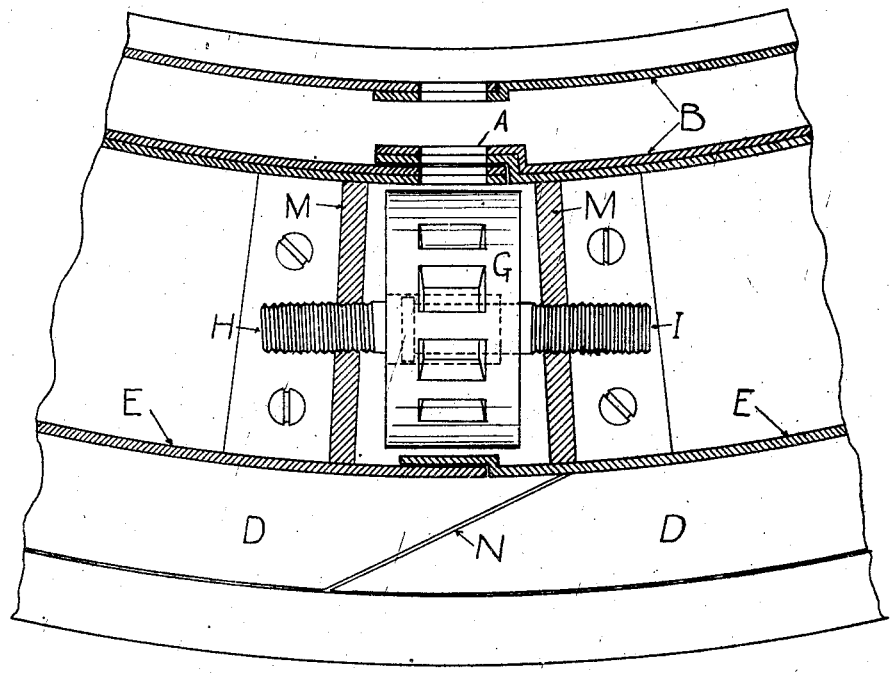

Figure 1 is a sectional view on the line 7—8 of Fig. 2, illustrating one embodiment of our invention; Fig. 2 is a sectional view on the line 1—2 of Fig. 2, the outside tire and a portion of the wheel felly being shown; Fig. 3 is a sectional view on the line 3—4 of Fig. 1; Fig. 4 is a sectional view on the line 5—6 of Fig. 3; Fig. 5 is a detail sectional view taken in the same plane as Fig. 1, and illustrating on a larger scale the means shown in Fig. 1 for adjusting the tire; and Fig. 6 is a detail sectional view, showing the tire-adjusting sprocket and a hand tool for operating it.

Referring to the drawings, B is an annular frame provided with a circumferential recess for receiving a series of springs C. The series of springs C are confined between the bottom of said circumferential recess and an annular frame E, which latter carries an annular rubber cushion D. The annular frames B and E are preferably formed of steel.

As shown especially in Figs. 2 and 5, all the above elements are inclosed in any well known form of outer casing. The annular frames B and E are split and provided with overlapping ends F for permitting expansion thereof in placing the tire on the wheel felly and adjusting it thereon, and the annular cushion D is split and provided with overlapping ends N for a similar purpose.

Flanged plates M are secured to the annular frame B adjacent its overlapping ends, and provided with threaded openings for receiving oppositely threaded screws H and I. A wheel G is shown rigidly secured to the screw H and splined on the screw I; said last screw being provided with longitudinal flanges K slidably engaging corresponding grooves L in the sprocket wheel. The annular frame B is slotted, as shown at A in Fig. 1, to permit insertion of the hand tool J for rotating the wheel G; a registering aperture being formed in the wheel felly to permit convenient adjustment of the tire when in position.

In the operation of our invention, the annular frames B and E, the spring C, and the rubber cushion D are assembled and incased in any well known form of outer casing P. We prefer to employ for this purpose the usual type of laced casing. The wheel G is then adjusted to permit sufficient expansion of the parts for positioning them on the wheel. The wheel G is then rotated by the hand tool J to adjust the ends of the annular frame D sufficiently to produce the desired degree of tire expansion.

It will be noted that the bottom of the circumferential recess against which the springs C bear is supported by side walls dependent from the curved walls of the annular frame B. This provides a very advantageous construction, in which the resiliency of the curved walls of the steel frame B will act efficiently upon abnormal load or sudden shock on the tire.

We have illustrated and described preferred and satisfactory constructions, but, obviously, changes could be made within the spirit and scope of our invention.

Having thus described our invention, what we claim as new therein and desire to secure by Letters Patent is:

1. A cushion tire comprising an outer casing inclosing a split annular frame provided with a circumferential recess, resilient means positioned in said recess, an outer split frame supported on said resilient means, an annular cushion carried by said outer frame, and means positioned within said annular frame for expanding and contracting said tire, substantially as described.

2. A cushion tire comprising an outer casing inclosing a split annular frame provided with a circumferential recess, a plurality of springs positioned radially in said recess, an outer split frame engaging the outer ends of said springs, an annular cushion carried by said outer frame, adjustable means positioned within said tire for regulating the expansion of the latter, and means for permitting actuation of said adjustable means from the exterior of said tire, substantially as described.

3. A cushion tire comprising an outer casing inclosing a split annular frame provided with a circumferential recess, a plurality of springs supported radially in said recess, an outer split frame engaging the outer ends of said springs, an annular cushion carried by said outer frame, oppositely threaded screws engaging the ends of said split annular frame, and a wheel rigidly secured to one of said screws and splined on the other of said screws for regulating expansion of the tire, substantially as described.

4. A cushion tire comprising an outer casing inclosing a hollow annular frame of curved cross section, said frame being provided with a circumferential recess comprising a bottom wall supported by said walls dependent from the curved walls of said frame, resilient means supported on the bottom of said recess, an outer frame supported on said resilient means, and an annular cushion carried by said outer frame, substantially as described.

J. PORTER PARSONS.
WILLIAM FLEMING.

Witnesses:
H. S. CARR,
CHARLES L. TOTTEN.